June 12, 1945. R. C. ZEIDLER 2,378,353
FLUID COUPLING
Filed April 5, 1941 3 Sheets-Sheet 3
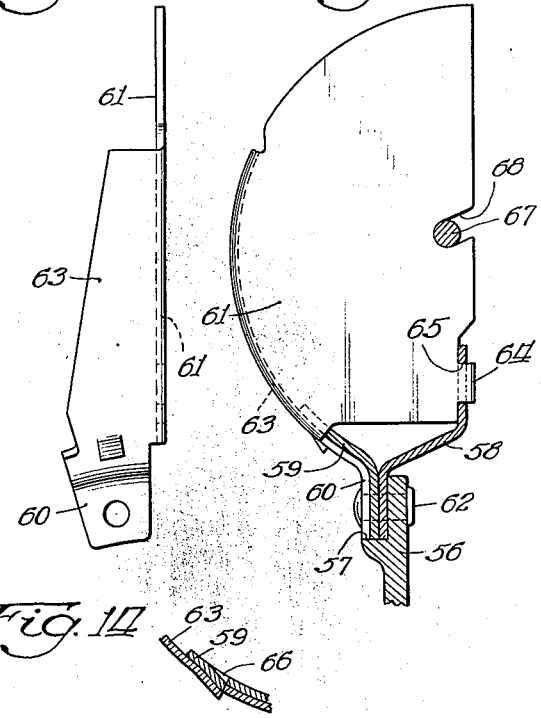
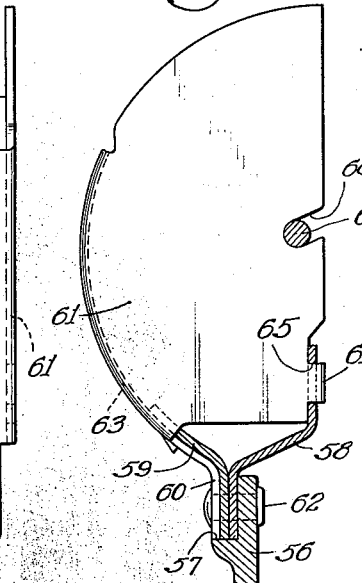
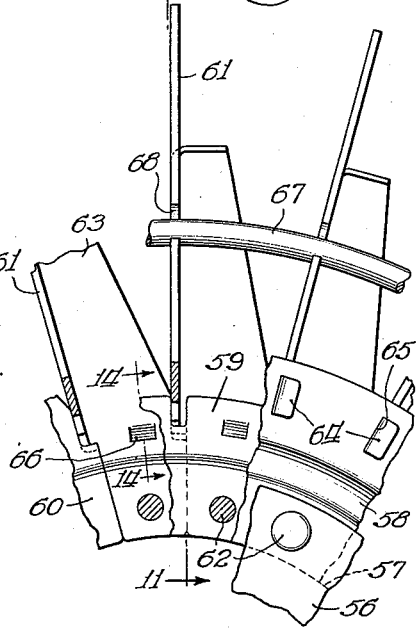
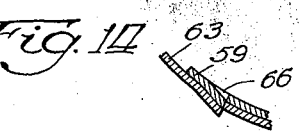
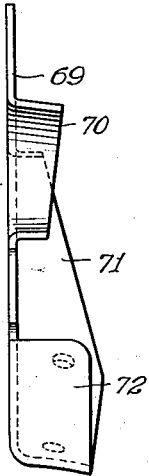
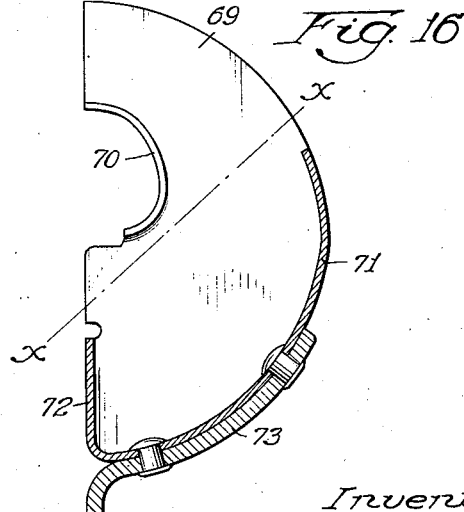
Inventor:
Reinhold C. Zeidler
By Edward C. Fritzbaugh
Atty.

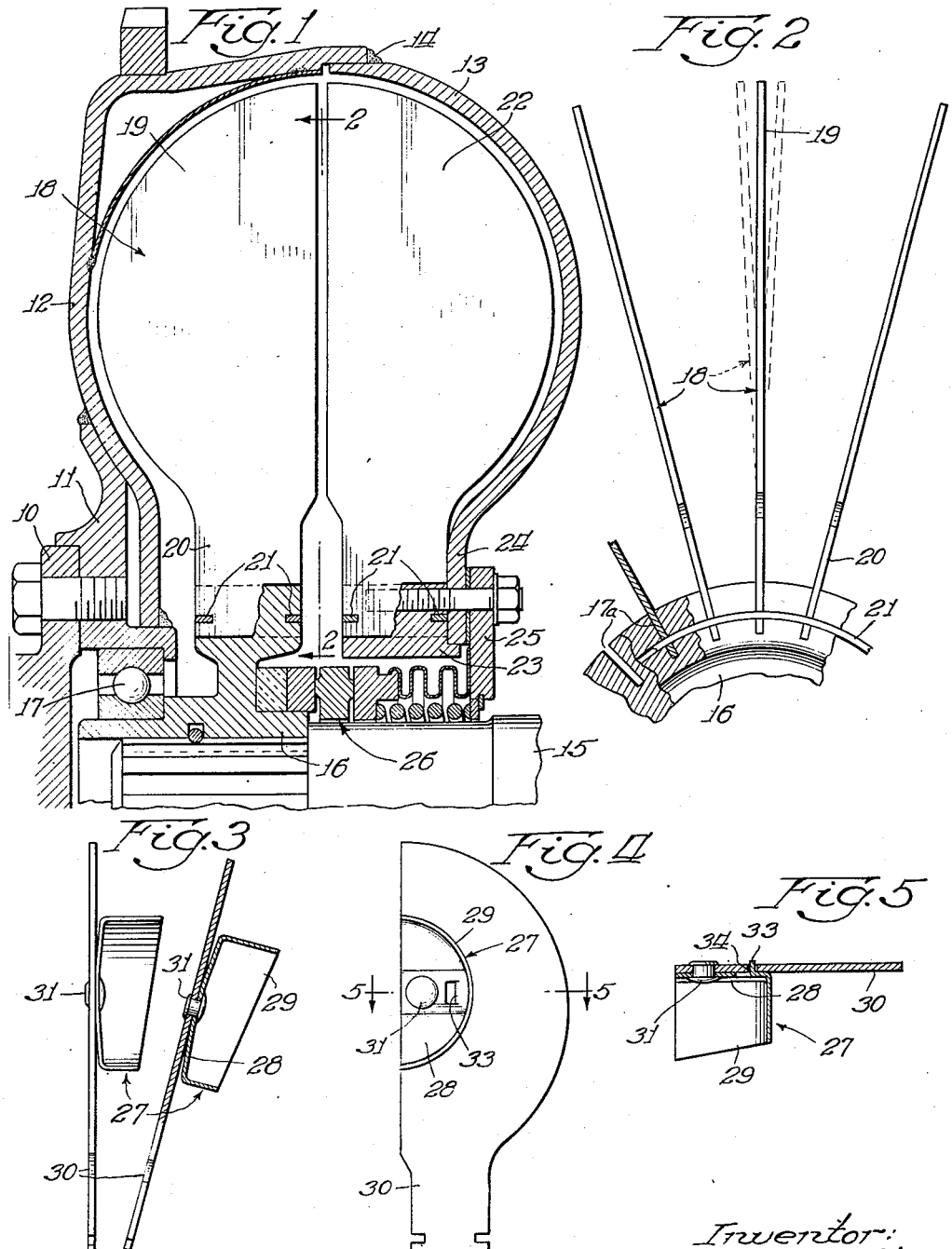

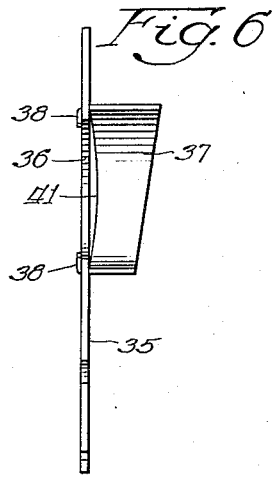
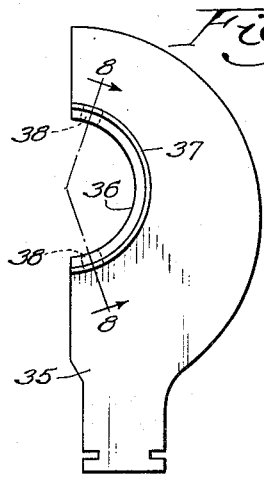
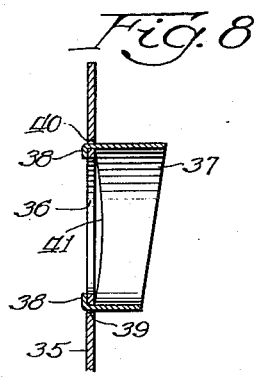
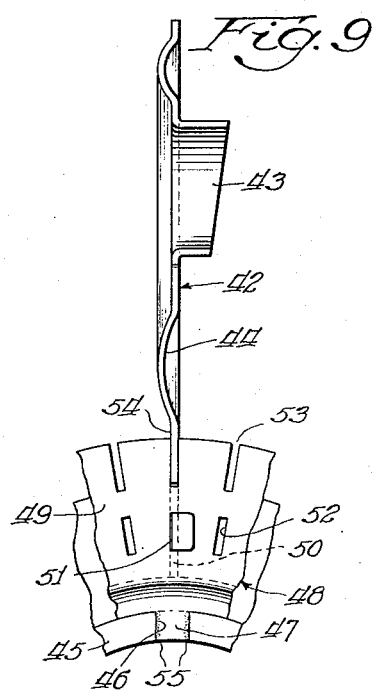
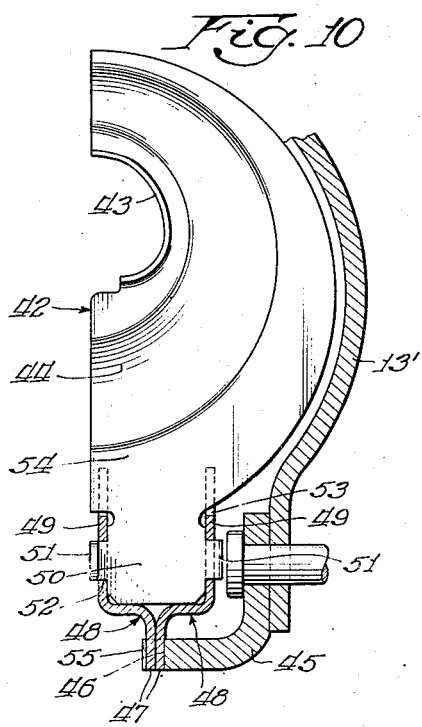

Patented June 12, 1945

2,378,353

UNITED STATES PATENT OFFICE 2,378,353

FLUID COUPLING

Reinhold C. Zeidler, Detroit, Mich., assignor to Borg-Warner Corporation, Chicago, Ill., a corporation of Illinois Application April 5, 1941, Serial No. 387,019

4 Claims. (Cl. 60—54)

This invention relates to hydraulic couplings of the vaned type.

The principal object of this invention is to provide an improved fluid coupling which is lighter and less expensive to make, and which incorporates a mechanical shock absorbing function to eliminate vibration and shocks during low slip conditions.

A specific object of this invention is to provide a fluid coupling wherein the vanes are free of the housing defining the hydraulic circuit so as to be able to move relatively thereto in such regions.

Another object of this invention is to provide a coupling having flexible vanes with means on each vane defining a core ring.

Another object of this invention is to provide a simplified mounting means for each vane so as to make unnecessary the use of elaborate and expensive special welding equipment.

These and other objects and features of this invention will become apparent from the following description when taken together with the accompanying drawings in which:

Fig. 1 is a fragmentary side elevation in section of a fluid coupling which represents the preferred embodiment of this invention;

Fig. 2 is a fragmentary front elevation showing the flexibility of the vanes;

Fig. 3 is a front elevation of a pair of flexible vanes having a section of a core ring attached thereto, one of said vanes being in section;

Figs. 4 and 5 are respectively side and top views of a flexible vane having a section of a core ring attached thereto, the latter view being a section taken along the line 5—5 of Fig. 4.

Figs. 6, 7 and 8 are front, side and sectional views of a modification of a flexible vane with a fragment of a core ring, the modification residing in the method of attaching the core ring to the vane;

Figs. 9 and 10 are front and side elevations of another modification of a vane wherein the core ring is formed integrally with the vane and a stamped construction of mounting means is used;

Figs. 11, 12 and 13 are side, front and rear views of yet another modification of a vane wherein the flexibility is limited by a flange formed at the edge of the vane;

Fig. 14 is a fragmentary section through a vane of Fig. 12 taken along line 14—14 thereof; and Figs. 15 and 16 are front and side elevations respectively of a further modification of vane.

Referring now to a detailed description of the invention and particularly to Figs. 1 and 2, 10 is a drive shaft to which is bolted a casting 11 which is welded to a stamped housing 12. A second stamping 13 having the form shown in Fig. 1 is welded to stamping 12 at 14 to form a fluid-tight housing for the fluid coupling. Said housing defines a substantially toroidal container.

A driven shaft 15 extends into the housing formed by stampings 12, 13 and supports a hub 16 at the forward or inner end thereof, said hub being splined to the shaft so as to form a driving connection with the latter. Hub 16 is in turn supported from casting 11 by means of a bearing 17. The outer periphery of hub 16 is provided with slots 17a into which are fitted flat flexible stamped vanes 18 having the shape shown in Fig. 1. It will be observed that the outer portion 19 of each vane is of a substantially semi-circular shape and that the radially inner portion 20 is of substantially rectangular shape. The inner portion 20 is only partially received in slots 17a so as to leave a section between the outer end of hub 16 and the semi-circular portion which is outside the working circuit of the coupling. No other support is provided for the vane and particularly no semi-toroidal shell is attached to the vanes as is customary in previous designs. For this reason the entire portion of the vane in the hydraulic circuit is free. In view of the relatively smaller width of inner portion 20, the principal flexing will occur at this point.

The vanes may be welded to the hub member 16 or they may be retained by means of rings 21 which fit into circular slots formed in the hub and vanes. The rings 21 may be held in place by swaging over the ends of the slots.

The driving vanes 22 may be exact duplicates of driven vanes 19 and may be similarly held in a slotted hub member 23. Said member 23, however, is preferably made in the form of an annulus which is bolted to the side of a radial flange 24 formed in stamping 13. An annular plate 25 is also bolted to flange 24 and serves as an abutment member for a bellows type seal 26 which is inserted between plate 25 and hub 16.

The construction just described possesses a number of advantages which improve both the efficiency and the operating characteristics of the coupling. By making both the driving and driven vanes entirely free of the housing in the working circuit and permitting the vanes to flex outside the working circuit, a vibration dampening effect is secured. This effect is available when the car is coasting against the engine as well as when the engine is driving. The elimination of a separate shell for the driven vanes increases the diameter of the permissible hydraulic working circuit without increasing the outside diameter of the housing. This results in a greater capacity for a given-sized coupling. The elimination of the driven vane shell practically eliminates axial thrust on the driven hub 16 and simplifies the bearing construction. Furthermore, the absence of a shell eliminates the problem of returning to the circuit fluid which had escaped to the outside of the shell into the reservoir commonly used for this purpose.

In some cases it may be desirable to provide a core ring for the coupling to assist in establishing a toroidal circuit for the fluid. This may be done in the manner disclosed in Figs. 3, 4 and 5. It will be observed that the vane of Figs. 1 and 2 has secured to it a stamping 27 in the form of one-half of a cup. Said stamping 27 is comprised of a bowed section 28 adjacent the vanes and a flange section 29 which defines the fluid circuit. Bowed section 28 is secured to vane 30 by means of a rivet 31 or other fastener which passes through the tangent portion of the section. A lug 33 bent outward from section 28 passes through an opening 34 in vane 30 and prevents the section from turning.

The portion 28 adjacent vane 30 is made bowed in order not to interfere with the flexing of the vanes. It will be noted that the circuit-defining portion 29 does not extend to the adjacent vane. This permits each vane to flex individually and independently of its adjacent vanes. By making portion 29 considerably smaller than the distance between vanes as shown in Fig. 3 a slotted core ring construction is secured which increases the efficiency of the coupling under certain circumstances.

Referring now to the modification disclosed in Figs. 6, 7 and 8, a similarly-shaped flexible vane 35 is formed with a portion cut away near its center to form a semi-circular notch 36. A single piece of flexible sheet metal 37 which is curved to define a hydraulic circuit is secured to vane 35 by means of tabs 38 which pass through apertures 39 and 40 in vane 35. Both of the apertures are close fitting apertures to prevent radial movement of the core ring section with respect to the vane. Between the tabs, the edge of the core ring is cut away as shown at 41 to form a concave surface. Said concave surface permits the vane to flex between the tabs and the flexibility of the core ring allows for the difference between the length of a chord (the straight-line distance between tabs) and the arc (concave surface 41) that the chord subtends. As in the modification disclosed in Figs. 3, 4 and 5, the stamping 37 does not extend to the adjacent vane and it may in fact be short enough to give the effect of a slotted core ring. It is a lighter construction than that previously described and is slightly less expensive.

Another modification of the flexible vane is shown in Figs. 9 and 10. In this modification the vane 42 has an integrally formed core ring section 43 and a groove 44 which limits the flexibility and assists in guiding the fluid.

A modification of the hub member 23 of Fig. 1 is also disclosed in Figs. 9 and 10. The modification comprises an inwardly turned flanged ring 45 which is secured to housing 13' so as to be rotatable therewith. Said ring 45 is provided with slots 46 at the inner end thereof which receive splines 47 formed in the ends of duplicate disc stampings 48 having offset outer regions 49. The substantially rectangular section 50 of vane 42 is received between the offset outer regions 49 and is provided with tabs 51 which fit into slots 52 in discs 48. Additional slots 53 are provided at the periphery of the discs to receive the main body of the vane 42 which extends beyond the sides of rectangular section 50. Discs 48 may be retained in slots 46 by means of welds 55. An unsupported flat region 54 between the peripheries of the discs and the groove 44 in the vane permits a certain amount of flexing to occur in the vanes 42.

The support shown in Figs. 9 and 10 is less expensive than the ones disclosed in Figs. 1 and 2, since it is comprised entirely of stampings. The diameter of the disc 48 may be chosen to expose a greater or lesser amount of flat region 54 to give any degree of flexibility desired in the vanes. The part of disc 48 extending into the hydraulic circuit may serve as a baffle to prevent the formation of shallow high velocity vortex circuits during high slip periods.

A second modification of the supporting means for the vanes is disclosed in Figs. 11, 12 and 13 together with the specific vane form with which it may be used. In this second modification a hub member 56 is formed with a shoulder 57 which centers a pair of diverging discs 58, 59 as well as an attaching sector 60 of a vane 61. A rivet 62 secures all three of these elements to hub 56.

Vane 61 to be used with the above supporting means is formed with an integral flange 63 which serves to stiffen the lower portion of the vane and also to guide the fluid around that portion of its circuit. At its inner edge, vane 61 is provided with tabs 64 which are received in slots 65 in disc 58. To provide additional support for the vanes, disc 59 is sheared through the vane at 66 as shown in Fig. 14 to insure the vane against moving rotationally with respect to disc 58. It will be observed that if rivet 62 should loosen and if no such support were provided, the vane might tend to rotate about a line passing through the rivet and tab 64. Still further support may be supplied by means of a wire hoop 67 which may be slipped into a notch 68 located near the center of the toroidal circuits. The purpose of the hoop is to provide a further means of resisting the radial centrifugal force in the vanes and yet permit free side-to-side movement resulting from the flexing of the vanes. The hoop is made of wire having high tensile strength butt-welded to form a hoop of definite diameter. In assembling the coupling the hoop is pressed into a circular groove in a fixture into which the vanes are subsequently assembled while the riveting or welding is being done at the inner ends. The vane assembly is then forced out of the fixture to allow the hoop to contract thereby creating a slight radially inward preload on all of the vanes.

As in all of the previous modifications no outer shell is used for the vanes and at least a portion of each of the vanes is free to flex under the influence of the fluid.

A third modification of the support for the vanes shown in Fig. 1 is disclosed in Figs. 15 and 16. In this modification the vane 69 has a core ring 70 formed integrally therewith as for example in Figs. 9 and 10 and has also a flange 71 formed around a portion of the outer periphery which is similar to flange 63 of vane 61. Flange 71, however, continues radially outwardly into the hydraulic circuit and forms a baffle 72. The flange 71 may be riveted to a suitable hub member 73 which is designed to possess sufficient rigidity to transmit the necessary torque without distortion. It will be noted that vane 69 is also flexible and that the flexibility may be controlled by choosing the proper length and size of flange 71. As shown in Figs. 15 and 16 the vane is flexible in the region between core ring 70 and the outer edges of baffle 72 and flange 71 as for example, along the lines x—x. The outer region is also flexible to a limited extent.

It is understood that the foregoing description is the preferred embodiment of the invention and that the scope of the invention is not to be limited thereto but is to be determined by the appended claims.

I claim:

1. A hydraulic torque transmitting device comprising a driving vaned element, a driven vaned element, a housing rotatable with the driving element and enclosing the driven element, said driven element comprising a hub member and flexible vanes extending therefrom said vanes having a flexible portion outside the working circuit of the fluid.

2. A hydraulic torque transmitting device as described in claim 1, said driving vaned element being likewise comprised of a hub member and flexible vanes extending therefrom, said vanes having a flexible portion outside the working circuit of the fluid.

3. In a hydraulic torque transmitting device a driving element comprising a hub member, a plurality of vanes drivingly associated with the hub member, said vanes having a flexible region between the hub member and the hydraulic working circuit, a driving shell surrounding the driving vanes, and means for securing the shell to the hub member, a portion of each of said vanes being free to move angularly with respect to the shell to absorb torsional vibrations.

4. In a hydraulic torque transmitting device a rotary element having a plurality of vanes drivingly associated therewith, a portion of each of said vanes being movable relative to one another, and flexibly formed elements connected to at least some of the vanes and defining a core ring, said vanes being flexible in the vicinity of the elements, said elements presenting a concave surface to the vanes and being secured thereto at the two normal points of contact, and said elements being independent of one another and movable with the vane connected thereto.

REINHOLD C. ZEIDLER.